Patented Oct. 3, 1933

1,928,773

UNITED STATES PATENT OFFICE 1,928,773

VULCANIZATION OF RUBBER

Ira Williams, Woodstown, N. J., and Carlton W. Croco, Wilmington, Del., assignors to E. I. du Pont de Nemours & Company, Wilmington, Del., a corporation of Delaware No Drawing. Application March 4, 1932
Serial No. 596,898

33 Claims. (Cl. 18—53)

This invention relates to the vulcanization of rubber and more particularly to a new class of vulcanization accelerators therefor.

Mercapto benzothiazole and many of its derivatives such as the normal and basic lead or zinc salts; the mono- and polysulfides; the guanidine salts; the reaction products of mercapto benzothiazole and aldehyde-amine condensation products; the dinitro chlor phenyl derivatives; and the reaction products of mercapto benzothiazole, amines and chlorine derivatives of carbon disulfide have been proposed as accelerators for the vulcanization of rubber. Mercapto benzothiazole and many of these derivatives are excellent accelerators but have the disadvantage that the accelerating action is exerted at relatively low temperatures often causing burning or pre-vulcanization on the mixing mills, thereby producing a rubber of inferior physical properties.

An object of the present invention is to provide a new class of chemical compounds. A second object is to provide a new class of easily prepared vulcanization accelerators. A third object is to provide a class of vulcanization accelerators having the accelerating characteristics of mercapto benzothiazole at elevated temperatures, but which are less active at low temperatures and thus will not cause scorching or pre-vulcanization in the mixing mill. Further objects are to provide a new composition of matter and to advance the art. Other objects will appear hereinafter.

These objects are accomplished according to the present invention which comprises reacting a salt of a mercapto benzothiazole with carbonyl chloride under such conditions that the chloride of the salt forming element or group is split off and a dibenzothiazyl 1-ss' dithio carbonate is formed.

Our invention is based upon the discovery that carbonyl chloride will react with salts of mercapto benzothiazoles to form new chemical compounds not heretofore known in the art and which are particularly adapted for accelerating the vulcanization of rubber.

In general, the process of preparing these new compounds comprises first preparing a suitable salt of mercapto benzothiazole, then dissolving or suspending this salt in a suitable liquid medium, and then passing carbonyl chloride into the solution or mixture, with agitation, until the mercapto benzothiazole salt has reacted with the carbonyl chloride. While any salt of a mercapto benzothiazole which will react with carbonyl chloride may be employed, we have discovered that the most suitable are the sodium, potassium, ammonium, zinc, cadmium and lead salts or salts of other metals which readily form chlorides. Since the majority of these salts are solids, it is most satisfactory to either dissolve the salt in a liquid medium or to suspend it in finely pulverized state in a liquid medium.

The liquid medium should be one with which the carbonyl chloride reacts less readily than with the salt. For example, where the sodium or potassium salts are employed, either water or alcohol may be used as the solvent or suspending medium. Where the zinc salt is employed, alcohol is less satisfactory because the slower action between the zinc salt and carbonyl chloride permits much of the carbonyl chloride to react with the alcohol. Accordingly, where the zinc and similar salts are employed, acetone, benzene, carbon tetra chloride or gasoline will be found to be the more satisfactory liquid suspending media. For the more ready separation of the products of the reaction and the recovery of the pure compound, it is desirable to employ, as the liquid medium, a substance in which one of the products of the reaction is insoluble and the other product is soluble. If the liquid medium is water or if moisture is present, it is also desirable to maintain the liquid slightly alkaline in order to obtain the purest product.

We have also found that it is desirable to maintain the materials in the reaction vessel well agitated during the addition of the carbonyl chloride and throughout the entire period of the reaction. While the temperature during the reaction may be varied within rather wide limits, it is desirable to maintain the temperature at about or below 40° C. for the most economical operation.

The salts of any of the mercapto benzothiazole compounds may be employed in this process. Some of the compounds of this class which we have found to produce particularly valuable vulcanization accelerators are those formed from the salts of mercapto benzothiazole, 3-ethoxy-1-mercapto benzothiazole, 5-ethoxy-1-mercapto benzothiazole, 3-methyl-1-mercapto benzothiazole, 4-methyl-1-mercapto benzothiazole, 5-methyl-1-mercapto benzothiazole; 3:4-dimethyl-1-mercapto benzothiazole, and 3:5-dimethyl-1-mercapto benzothiazole.

In order to more clearly illustrate the preferred methods of preparing these compounds, the following examples are given:

*Example 1.*—Sixty-four and eight-tenths (64.8) parts by weight of mercapto benzothiazole were added with 16 parts of sodium hydroxide to 4000 parts of water stirred until all was dissolved. This solution was then cooled to about 10° C. and, while being rapidly stirred, a stream of carbonyl chloride was led in. A dilute sodium hydroxide solution was run in at such a rate that the solution remained alkaline. The addition of the carbonyl chloride was continued until no more precipitate was formed in a filtered test portion when treated with carbonyl chloride. After the reaction was complete the accelerator was filtered off and dried. The resulting product is a pale yellow solid, soluble in benzene, and melts with decomposition at about 134° C.

*Example 2.*—Twenty and five-tenths (20.5) parts by weight of the potassium salt of mercapto benzothiazole were finely ground and suspended in 100 parts of dry benzene. Five parts of carbonyl chloride were dissolved in 50 parts of dry benzene. Both solutions were cooled and mixed at about 5° C. The stirring was continued for 30 minutes, after which time, the precipitated potassium chloride was filtered off. The accelerator was recovered by evaporation of the benzene.

*Example 3.*—The process of Example 2 was followed except that dry acetone was employed in place of the benzene.

*Example 4.*—Forty (40) parts of the zinc salt of mercapto benzothiazole were suspended in 300 parts of benzene. After cooling to about 10° C. carbonyl chloride was passed into the mixture until the weight had increased 10 parts. Stirring was continued for 30 minutes. The product was filtered and the accelerator recovered by evaporation of the filtrate.

Dibenzothiazyl 1-ss' dithio carbonate is a moderately active accelerator at high vulcanization temperature, but is weak when lower temperatures are employed. This is a distinct advantage since it permits milling, calendering, and similar operations, which develop considerable heat, to be carried out with greater freedom from scorching difficulty. This difference may be illustrated by vulcanizing a compound consisting of 100 parts of rubber, 25 parts of carbon black, 5 parts of zinc oxide, 3 parts of sulfur, and 1 part of dibenzothiazyl 1-ss' dithio carbonate. When this mix was vulcanized for 15 minutes at 287° F. and tested, the load at 500% elongation amounted to 1025 pounds per square inch. However, when the vulcanization was carried on at 259° F. for 15 minutes, the same test showed a load of only 175 pounds per square inch at 500% elongation.

In the above examples, we have disclosed processes employing salts of mercapto benzothiazole. However it is understood that the same processes may be employed with salts of substituted mercapto benzothiazoles, some of which have been mentioned. Other substituted mercapto benzothiazole compounds, the salts of which deserve special attention are the mercapto benzothiazoles having one or more ethyl groups substituted in the benzene ring, the methoxy benzothiazoles, and in fact, the alkyl and alkoxy substituted mercapto benzothiazoles generally. The salts of the aryl substituted mercapto benzothiazoles such as the 5-phenyl mercapto benzothiazole and of the mercapto benzothiazoles having halogen and like radicals or elements substituted in the benzene ring may also be mentioned. Accordingly, when we refer in the specification and claims to a mercapto benzothiazole or the salt of a mercapto benzothiazole, it is to be understood that such term includes not only mercapto benzothiazole but also the various substituted mercapto benzothiazoles.

While we have disclosed certain specific compounds and compositions of matter and certain specific methods of preparing the same, it will be apparent to those skilled in the art that many other compounds and compositions of matter may be prepared and the processes of preparing the same may be variously modified and variations may be made in the proportions employed without departing from the spirit of our invention. Accordingly, the scope of our invention is to be limited solely by the appended claims construed as broadly as is permissible in view of the prior art.

We claim:

1. A new composition of matter which comprises a dibenzothiazyl 1-ss' dithio carbonate.

2. The method of preparing a new chemical compound which comprises reacting a salt of a mercapto benzothiazole with carbonyl chloride.

3. The method of preparing a new chemical compound which comprises reacting carbonyl chloride with a salt of mercapto benzothiazole, the reacting compounds being in such proportions that one molecule of carbonyl chloride will combine with two molecules of the mercapto benzothiazole.

4. The method of preparing a new chemical compound which comprises reacting carbonyl chloride with an inorganic salt of a mercapto benzothiazole, the reacting compounds being in such proportion that they will combine in the rates of two molecules of the mercapto benzothiazole to one molecule of carbonyl chloride.

5. The method of preparing a new chemical compound which comprises reacting carbonyl chloride with a salt of a mercapto benzothiazole in a liquid medium less reactive to carbonyl chloride than the salt, the reacting compounds being in such proportion that they will combine in the ratio of two molecules of the mercapto benzothiazole to one molecule of carbonyl chloride.

6. The method of preparing a new chemical compound which comprises reacting carbonyl chloride with a salt of a mercapto benzothiazole in a liquid medium less reactive to carbonyl chloride than the salt and in which one of the products of the reaction is insoluble and the other product is soluble, the reacting compounds being in such proportion that they will combine in the ratio of two molecules of the mercapto benzothiazole to one molecule of carbonyl chloride.

7. The method of preparing a new chemical compound which comprises reacting carbonyl chloride with a salt of a mercapto benzothiazole in a liquid medium less reactive to carbonyl chloride than the salt and maintaining the temperature of the reaction at about 40° C. or less, the reacting compounds being in such proportion that they will combine in the ratio of two molecules of the mercapto benzothiazole to one molecule of carbonyl chloride.

8. Rubber having incorporated therein, as a vulcanization accelerator, a dibenzothiazyl 1-ss' dithio carbonate.

9. The method of making vulcanized rubber which comprises mixing unvulcanized rubber with vulcanizing substances and a dibenzothiazyl 1-ss' dithio carbonate and then vulcanizing the mix.

10. A new composition of matter which comprises dibenzothiazyl 1-ss' dithio carbonate.

11. A new composition of matter which comprises a member of the group consisting of alkyl and alkoxy substituted dibenzothiazyl 1-ss' dithio carbonates.

12. A new composition of matter which comprises a dibenzothiazyl 1-ss' dithio carbonate derived from a methyl-1-mercapto benzothiazole.

13. A new composition of matter which comprises a dibenzothiazyl 1-ss' dithio carbonate derived from 3-methyl-1-mercapto- benzothiazole.

14. A new composition of matter which comprises a dibenzothiazyl 1-ss' dithio carbonate derived from an ethoxy-1-mercapto benzothiazole.

15. A new composition of matter which comprises a dibenzothiazyl 1-ss' dithio carbonate derived from 5-ethoxy-1-mercapto benzothiazole.

16. The method of preparing a new chemical compound which comprises reacting carbonyl chloride with a salt of mercapto benzothiazole, the reacting compounds being in such proportions that one molecule of carbonyl chloride will combine with two molecules of the mercapto benzothiazole.

17. The method of preparing a new chemical compound which comprises reacting carbonyl chloride with a salt of a member of the group consisting of alkyl and alkoxy substituted mercapto benzothiazoles, the reacting compounds being in such proportions that one molecule of carbonyl chloride will combine with two molecules of the mercapto benzothiazole.

18. The method of preparing a new chemical compound which comprises reacting carbonyl chloride with a salt of a methyl-1-mercapto benzothiazole, the reacting compounds being in such proportions that one molecule of carbonyl chloride will combine with two molecules of the mercapto benzothiazole.

19. The method of preparing a new chemical compound which comprises reacting carbonyl chloride with a salt of 3-methyl-1-mercapto benzothiazole, the reacting compounds being in such proportions that one molecule of carbonyl chloride will combine with two molecules of the mercapto benzothiazole.

20. The method of preparing a new chemical compound which comprises reacting carbonyl chloride with a salt of an ethoxy-1-mercapto benzothiazole, the reacting compounds being in such proportions that one molecule of carbonyl chloride will combine with two molecules of the mercapto benzothiazole.

21. The method of preparing a new chemical compound which comprises reacting carbonyl chloride with a salt of 5-ethoxy-1-mercapto benzothiazole, the reacting compounds being in such proportions that one molecule of carbonyl chloride will combine with two molecules of the mercapto benzothiazole.

22. Rubber having incorporated therein, as a vulcanization accelerator, dibenzothiazyl 1-ss' dithio carbonate.

23. Rubber having incorporated therein, as a vulcanization accelerator, a member of the group consisting of alkyl and alkoxy substituted dibenzothiazyl 1-ss' dithio carbonates.

24. Rubber having incorporated therein, as a vulcanization accelerator, a dibenzothiazyl 1-ss' dithio carbonate derived from a methyl-1-mercapto benzothiazole.

25. Rubber having incorporated therein, as a vulcanization accelerator, a dibenzothiazyl 1-ss' dithio carbonate derived from 3-methyl-mercapto benzothiazole.

26. Rubber having incorporated therein, as a vulcanization accelerator, a dibenzothiazyl 1-ss' dithio carbonate derived from an ethoxy-1-mercapto benzothiazole.

27. Rubber having incorporated therein, as a vulcanization accelerator, a dibenzothiazyl 1-ss' dithio carbonate derived from 5-ethoxy-1-mercapto benzothiazole.

28. The method of making vulcanized rubber which comprises mixing unvulcanized rubber with vulcanizing substances and dibenzothiazyl 1-ss' dithio carbonate and then vulcanizing the mix.

29. The method of making vulcanized rubber which comprises mixing unvulcanized rubber with vulcanizing substances and a dibenzothiazyl 1-ss' dithio carbonate derived from a member of the group consisting of alkyl and alkoxy substituted 1-mercapto benzothiazoles and then vulcanizing the mix.

30. The method of making vulcanized rubber which comprises mixing unvulcanized rubber with vulcanizing substances and a dibenzothiazyl 1-ss' dithio carbonate derived from a methyl-1-mercapto benzothiazole and then vulcanizing the mix.

31. The method of making vulcanized rubber which comprises mixing unvulcanized rubber with vulcanizing substances and the dibenzothiazyl 1-ss' dithio carbonate derived from 3-methyl-1-mercapto benzothiazole and then vulcanizing the mix.

32. The method of making vulcanized rubber which comprises mixing unvulcanized rubber with vulcanizing substances and a dibenzothiazyl 1-ss' dithio carbonate derived from an ethoxy-1-mercapto benzothiazole and then vulcanizing the mix.

33. The method of making vulcanized rubber which comprises mixing unvulcanized rubber with vulcanizing substances and the dibenzothiazyl 1-ss' dithio carbonate derived from 5-ethoxy-1-mercapto benzothiazole and then vulcanizing the mix.

IRA WILLIAMS.
CARLTON W. CROCO.

CERTIFICATE OF CORRECTION.

Patent No. 1,928,773.　　　　　　　　　　　　　　　　October 3, 1933.

IRA WILLIAMS, ET AL.

It is hereby certified that error appears in the printed specification of the above numbered patent requiring correction as follows: Page 2, line 1, after "water" insert the word and; line 99, claim 3, after "of" insert the article a; and line 109, claim 4, for "rates" read ratio; page 3, line 88, claim 25, for "3-methyl-mer-" read 3-methyl-1-mer-; and that the said Letters Patent should be read with these corrections therein that the same may conform to the record of the case in the Patent Office.

Signed and sealed this 28th day of November, A. D. 1933.

F. M. Hopkins (Seal)　　　　　　　　　　　　　　　　　　　　　Acting Commissioner of Patents.